US007917484B1

(12) United States Patent
Vermeulen et al.

(10) Patent No.: US 7,917,484 B1
(45) Date of Patent: Mar. 29, 2011

(54) INDIVIDUALIZED DIGITAL TRACERS

(75) Inventors: Allan H. Vermeulen, Seattle, WA (US); Satbir S. Khanuja, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 435 days.

(21) Appl. No.: 11/096,223

(22) Filed: Mar. 31, 2005

(51) Int. Cl.
G06F 7/00 (2006.01)
G06F 17/30 (2006.01)

(52) U.S. Cl. ........ 707/705; 707/802; 707/923; 707/930; 713/176

(58) Field of Classification Search ................ 713/176; 707/700–789, 802, 923, 930
See application file for complete search history.

(56) References Cited

U.S. PATENT DOCUMENTS

| | | | |
|---|---|---|---|
| 5,418,948 A | 5/1995 | Turtle | |
| 5,530,759 A * | 6/1996 | Braudaway et al. | 380/54 |
| 5,629,980 A | 5/1997 | Stefik et al. | |
| 5,634,012 A | 5/1997 | Stefik et al. | |
| 6,233,684 B1 | 5/2001 | Stefik et al. | |
| 6,282,653 B1 * | 8/2001 | Berstis et al. | 726/26 |
| 6,912,294 B2 | 6/2005 | Wang et al. | |
| 7,031,471 B2 | 4/2006 | Stefik et al. | |
| 7,167,825 B1 | 1/2007 | Potter | |
| 7,171,016 B1 | 1/2007 | Rhoads | |
| 7,227,996 B2 | 6/2007 | Imagawa et al. | |
| 7,436,978 B2 * | 10/2008 | Wadhwa et al. | 382/100 |
| 2002/0015042 A1 * | 2/2002 | Robotham et al. | 345/581 |
| 2002/0033844 A1 * | 3/2002 | Levy et al. | 345/744 |
| 2002/0168082 A1 * | 11/2002 | Razdan | 382/100 |
| 2003/0023640 A1 * | 1/2003 | Challenger et al. | 707/530 |
| 2003/0061489 A1 * | 3/2003 | Pelly et al. | 713/176 |
| 2003/0165253 A1 * | 9/2003 | Simpson et al. | 382/100 |
| 2003/0190054 A1 * | 10/2003 | Troyansky et al. | 382/100 |
| 2003/0196093 A1 * | 10/2003 | Raley et al. | 713/176 |
| 2004/0034630 A1 | 2/2004 | Volcani et al. | |
| 2004/0123247 A1 * | 6/2004 | Wachen et al. | 715/530 |
| 2004/0189682 A1 * | 9/2004 | Troyansky et al. | 345/700 |
| 2005/0141750 A1 * | 6/2005 | Rhoads et al. | 382/100 |
| 2006/0095775 A1 * | 5/2006 | Jajodia et al. | 713/176 |
| 2006/0112131 A1 | 5/2006 | Harrold et al. | |

(Continued)

OTHER PUBLICATIONS

Lumini et al., "Adaptive positioning of a visible watermark in a digital image", IEEE, 2004, vol. 2; p. 967-970. Download: http://ieeexplore.ieee.org/stamp/stamp.jsp?arnumber=1394363&tag=1.*

(Continued)

*Primary Examiner* — Jean B. Fleurantin
*Assistant Examiner* — Hares Jami
(74) *Attorney, Agent, or Firm* — Robert C. Kowert; Meyertons, Hood, Kivlin, Kowert & Goetzel, P.C.

(57) ABSTRACT

Method and apparatus for inserting digital tracers in data that allow particular copies of the data to be traced to particular entities. Embodiments of a tracer mechanism may programmatically insert individualized tracers into data copies provided to third parties, for example via a Web service interface. A tracer may appear as normal data to the reader, and does not interfere with the typical use of the data copy. Tracers may serve as unique identifiers for particular data copies provided to particular Web service clients, allowing instances of the data copies to be associated with particular Web service clients. Embodiments may, for example, allow an enterprise to programmatically and systematically track copies of data distributed to third parties to help insure that the terms and conditions of licensing agreements are not violated. In one embodiment, the tracer mechanism may be implemented as a Web service.

35 Claims, 11 Drawing Sheets

U.S. PATENT DOCUMENTS

| | | | |
|---|---|---|---|
| 2006/0136466 | A1 | 6/2006 | Weiner et al. |
| 2006/0168450 | A1* | 7/2006 | Yagawa ........................ 713/176 |
| 2007/0073678 | A1 | 3/2007 | Scott et al. |
| 2007/0244693 | A1 | 10/2007 | Atallah et al. |
| 2008/0059153 | A1 | 3/2008 | Bennett |
| 2009/0144248 | A1 | 6/2009 | Treadgold et al. |

OTHER PUBLICATIONS

Fu et al., "A novel method to embed watermark in different halftone images: data hiding by conjugate error diffusion (DHCED)", IEEE, 2003. vol. 1;p. 609-612. Download: http://ieeexplore.ieee.org/stamp/stamp.jsp?arnumber=1220991.*

U.S. Appl. No. 11/479,825, filed Jun. 30, 2006.

Kocher, et al., "Self-Protecting Digital Content," A Technical Report from the CRI Content Security Research Initiative, Copyright 2002-2003, pp. 1-14.

Dennis Fisher, "Securing Digital Content," eweek.com article, http://www.eweek.com/article2/0,1759,1660148,00.asp, Apr. 21, 2003, pp. 1-5.

"Microsoft DRM Technologies Establish Foundation for Emerging Internet Music, Video and eBooks Industries", http://www.microsoft.com/presspass/press/2002/jun01/03-13DRMPR.asp, Jun. 13, 2001, pp. 1-3.

SDKs and Versions of Windows Media DRM, http://www.microsoft.com/windows/windowsmedia/forpros/drm/sdksandversion.asp, pp. 1-4.

Microsoft Corporation, "Architecture of Windows Media Rights Manager," http://www.microsoft.com/windows/windowsmedia/howto/articles/drmarchitecture.asp, May 2004, pp. 1-4.

Andrea Pruneda, "Using Windows Media Encoder to Protect Content," Microsoft Corporation, http://www.microsoft.com/windows/windowsmedia/howto/articles/ProtectContetasp, Mar. 2003, pp. 1-5.

XrML—The Digital Rights Language for Trusted Content and Services, http://www.xrml.com/about.asp, Copyright 2002-2005, pp. 1-2.

XrML—Frequently Asked Questions (FAQ), http://www,xrml.org/faq.asp, Copyright 2002-2005, pp. 1-4.

Faultline, "CE Giants Open DRM to the Community," http://www.theregister.co.uk/2005/01/24/community_source_program/, Jan. 24, 2005, pp. 1-4.

Erikson, et al., "Principals for Standardization and Interoperability in Web-based Digital Rights Management", http://www.w3.org/2000/12/drm-ws/pp/hp-erikson.html, Jan. 2001, pp. 1-6.

Hallam-Baker, et al., "WS-Security profile for XML-based Tokens," http://www.ibm.com/developerworks/library/ws-sectoken.html, Aug. 28, 2002, pp. 1-9.

* cited by examiner

| Client 224 identifier | Data copy 250 identifier | Tracer 252 identifier |
| --- | --- | --- |
| Client A identifier | Data copy A identifier | Tracer A identifier |
| Client B identifier | Data copy B identifier | Tracer B identifier |
| ... | ... | ... |

Tracer data 254

Figure 4

This film/movie is an excellent/outstanding example of a fun/ enjoyable movie/film that is suitable to/viewable by the whole/ entire family. <Synonym pair>...<Synonym pair>...

Figure 5A

<Movie Name> is an excellent/outstanding example of a fun/ enjoyable movie/film that is suitable to/viewable by the whole/ entire family. <Synonym pair>...<Synonym pair>...

Figure 5B

INDIVIDUALIZED DIGITAL TRACERS

BACKGROUND OF THE INVENTION

1. Field of the Invention

This invention relates to computer networks, and, more particularly, to inserting individualized digital tracers into copies of data distributed on a network.

2. Description of the Related Art

Web services may be used to provide Web software developers access to technology platforms and data, such as product catalogs, hosted on Web servers, or Web sites. Through Web services, developers may be empowered to innovate and build businesses by creating dynamic, interactive Web sites and Web applications that leverage Web services to access services, applications, and data on other Web servers/Web sites.

Generally speaking, a Web service interface may be configured to provide a standard, cross-platform API (Application Programming Interface) for communication between a client requesting some service to be performed and the service provider. In some embodiments, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

FIG. 1 is a block diagram that illustrates an exemplary system configuration that provides a Web service interface to the logic and/or data of a Web site. In this example, a Web site, such as an e-commerce Web site, may be implemented on one or more servers 102, one or more of which may be coupled to Internet 100. Server(s) 102 may include software and/or hardware that implements enterprise logic 104 through which the functionalities of the Web site may be supported, for example through which items offered by an e-commerce Web site may be ordered.

Servers 102 may be coupled to data storage 110 for storing information in database 112 related to the Web site that may include, but is not limited to, Web pages, data related to the Web site, such as product information for an e-commerce Web site, and customer information. Data storage 110 may be implemented as one or more storage devices configured independently or as a storage system. In general, data storage 110 may be implemented as one or more of any type of storage device and/or storage system suitable for storing data used by the server systems of the Web site including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof.

Database 112 may be implemented as a single, monolithic database or as a combination of two or more databases and/or data stored in other, non-database formats, such as files stored in any of various file formats, including, but not limited to, Web pages such as product information Web pages providing details on products from a catalog of products offered through an e-commerce Web site. Database 112 may be or may include a relational database, or may be or may include any other type of database, such as an object oriented database, depending on implementation, or combinations thereof.

One or more client systems 122 may be coupled to Internet 100. Each client system 122 may be configured to access the Web site using a Web client application, such as a Web browser, via a Web client interface 108. One or more other servers 120 may be coupled to Internet 100, such as servers that implement the Web sites of other enterprises, institutions, individuals, etc., or even other Web sites of the enterprise that provides server(s) 102. One or more of servers 120 may be configured to access enterprise logic 104 of servers 102 and/or database 112 via a Web service interface 106 provided by one or more of servers 102. Note that Web service interface does not provide a "Web browser" interface to enterprise logic 104 and database 112, but instead provides a programmatic interface via an API through which at least some functionality of enterprise logic 104 and/or at least some data in database 112 may be programmatically accessed by applications hosted on servers 120. An application that accesses enterprise logic 104 and/or database 112 via Web service interface 106 may be referred to as Web service clients. Note that a server 120 including a Web service client may provide Web sites accessible to clients 122 via Web browsers, and the Web service client may be configured to access enterprise logic 104 and/or database 112 of servers 102 via Web service interface 106 to provide access to at least a portion of logic 104 and/or database 112 via the Web site provided by the server 120.

While FIG. 1 illustrates an exemplary system configuration in which a Web site provides both a Web client interface and an Web service interface for accessing enterprise logic and/or data of the Web site, Web services may be used to provide programmatic access to applications, services and/or data not associated with a conventional Web site accessible to clients via a Web browser. FIG. 2 is a block diagram that illustrates an exemplary system configuration that provides a Web service interface, and shows the interaction between a Web service client and a Web service provider in more detail. In this example, a Web service interface 106 may be implemented on a server 130 coupled to Internet 100. This server 130 may be referred to as a "Web service provider". Server 130, or alternatively one or more other servers coupled to server 130, may include one or more applications or services 108. Server 130 may be coupled to data storage 140 for storing information in database 142. Database 142 may include any type of data.

Server 120 may be coupled to Internet 100. Server 120 may host a Web service client 124. Web service client 124 may be configured to programmatically access application or service 108 of server 130 and/or database 142 via Web service interface 106. Note that Web service interface does not provide a "Web browser" interface, but instead provides a programmatic interface via an API through which at least some functionality of application or service 108 and/or at least some data in database 142 may be programmatically accessed by Web service client 124. Also note that server 120 may provide a Web site accessible to client(s) 122 via Web browsers, and Web service client 124 may be configured to access at least some functionality of application or service 108 and/or at least some data in database 142 of server 130 via Web service interface 106 to provide access to at least some functionality of application or service 108 and/or at least some data in database 142 via the Web site provided by server 120.

To access an application, service or data provided by the Web service provider 130, Web service client 124 may send a request message to Web service interface 106 via Internet 100. Web service provider 130 may then process the request, for example by performing an indicated function(s) of application or service 108 or accessing indicated data in database

142. Web service interface 106 may then return results of the processing to the Web service client 124 in a response message via Internet 100.

Web services may be used in a variety of applications. One example of an area in which Web services may be used is for product merchandising. A first enterprise may provide a Web site or Web application hosted on one or more Web servers that may access information from a second enterprise's Web server or Web servers through Web services provided by the second enterprise's Web server(s), such as product catalog information, to merchandise products from the product catalog through the first enterprise's Web site or Web application. The second enterprise may earn a commission from the first enterprise for each sale.

An enterprise may sublicense at least part of a collection of potentially copyrighted data owned by the enterprise, such as product information in a product catalog, to third party developers under some sort of licensing agreement. The third party developers may be given access to the data in a systematic fashion through a Web service interface, through which the third parties may request and receive copies of particular portions of the data collection. The third party developers may, in some cases, refurbish data received from the enterprise and sell it or redistribute it to some other party, possibly in violation of the licensing agreement.

Various mechanisms for protecting copyrighted works and materials from unauthorized copying and/or for detecting illicit copies of copyrighted works have been implemented. Falsified content may be inserted into copyrighted material with the intent of deterring, and detecting, illicit or unauthorized copying of the material, both for works that are in print and electronic/digital works. For example, mapmakers may insert deliberately inaccurate or fictitious roads or place names in maps. Enterprises that provide phone directories may insert fictitious listings into the directories. The intent of this falsified content is to be perceivable but not easily recognizable as "false content" to the casual viewer, including those who might want to illicitly copy the material. The publisher of a work knows what content of the work is fictitious, but the copyright infringer does not. If some entity illicitly uses portions from this material that includes the falsified content, the illicit use may be detected by the inclusion of the falsified content. Conventionally, the same fictitious information is inserted into each published copy of a work.

"Watermarks" may be inserted into various works, both works that are in print and electronic/digital works. The intent of watermarks is generally to mark a work in such a way as to not interfere with the work itself, while providing a mechanism to help protect the work from being illicitly copied, or to at least to make it easier to detect illicit or unauthorized copies. Watermarks for printed works are generally invisible under normal conditions, and only visible under certain conditions, such as when a copy of the work is held up to a bright light. Digital watermarks are generally "invisible" and cannot be perceived by the casual viewer. As far as the casual viewer is concerned, the digital watermark is simply not there. This is in contrast with the inserted falsified content described above, which is readily perceivable by a person viewing the material including the falsified content, although the typical viewer does not recognize the content as fictitious. Conventionally, as is the case for the inserted falsified content described above, the same watermark is inserted into each published copy of a work.

Various works, both works that are in print and electronic/ digital works, may be individually marked in such a way so that one particular copy of the work may be uniquely distinguished from another copy of the work. An example is the use of serial numbers on works, both "real" and electronic/digital works. Some mechanisms may "hide" this information so that it is not easily perceivable in the work.

SUMMARY

Various embodiments of a method and apparatus for programmatically inserting digital tracers in data that allow particular copies of the data to be traced to particular entities are described. Embodiments may provide a tracer mechanism that may programmatically insert individualized, human-perceivable tracers into excerpted copies of a work or portions of a collection of works (e.g., a product catalog or database) to be distributed to one or more recipients, such as Web service clients, typically under an agreement that may stipulate how the data copies may be used and if and how the data copies may be redistributed. A tracer may appear as normal data to the reader, and does not interfere with the typical use of the data copy into which it is inserted. The data copies may be distributed to Web service clients via an electronic network and, more particularly, via a Web Service interface. The tracer may be any type of data, including, but not limited to, textual, graphical (image), audio or video data.

The individualized tracers may serve as unique identifiers for data copies accessed by or provided to particular Web service clients, allowing instances of the data copies located anywhere on the Web to be associated with the particular Web service clients to which the data copies were originally provided. Embodiments of the tracer mechanism may, for example, allow an enterprise to programmatically and systematically track copies of data distributed to third party developers to help insure that the terms and conditions of licensing agreements are not violated.

In one embodiment of the tracer mechanism, an individualized tracer may be inserted into each data copy distributed to Web service clients. In other embodiments, rather than inserting a tracer into each distributed data copy, tracers may be inserted into a subset of systematically or randomly selected data copies provided to Web service clients. One embodiment of the tracer mechanism may provide the ability to customize tracers to particular requests for particular data and/or for particular Web service clients.

In one embodiment, to generate tracers, the tracer mechanism may access a database of generic tracer templates, together with a rule set that can "fill in" the templates to generate the specific individualized tracers. Each tracer may be unique to the particular data copy to which it is attached and which is provided to a particular Web service client, thus enabling the tracers to be used to "trace" or track the distribution of the particular data copy on the Internet, and to link instances of the particular data copy to the particular Web service client to which it was originally provided, even if an instance of the data copy is found on some other location on the network than Web service client system.

Embodiments of the tracer mechanism may be configured to search the Web for instances of a data copy including an individualized tracer that have been illicitly copied, for example to Web sites that are not covered by the terms and conditions for use of the material according to the agreement or contract between the Web service provider and the Web service client. The search may generate a pool of candidate Web pages that may include an instance of the data copy with inserted tracer. These candidate Web pages may then be further examined to determine which of the Web pages actually include an instance of the data copy with inserted tracer. Once this subset of candidate Web pages is determined, the subset may be further examined to determine which of the Web pages, if any, include illicit or unauthorized instances of the data copy. Since the tracer is individualized and thus linkable to the Web service client that originally obtained the data copy, the tracer may be used to determine which of the Web sites include legitimate copies and which include illicit or unauthorized copies.

In one embodiment, the tracer mechanism may be a Web service with a Web service interface that allows Web service clients to access the tracer mechanism to insert individualized tracers into data copies, for example data copies extracted from third-party works or collections, and to access the detection mechanism of the tracer mechanism to detect illicit or unauthorized instances of the data copies on the Web.

BRIEF DESCRIPTION OF THE DRAWINGS

FIG. 4 illustrates exemplary tracer data that may be generated and used by a tracer mechanism according to one embodiment.

FIG. 5A illustrates an exemplary product review as an exemplary tracer template, permutations of which may be generated and inserted into copies of particular data distributed to Web service client applications as individualized tracers according to one embodiment.

FIG. 5B illustrates an exemplary product review as an exemplary tracer template that may be customized to match a particular product or work, and permutations of which may be generated and inserted into copies of particular data distributed to Web service client applications as individualized tracers according to one embodiment.

Figure 1:
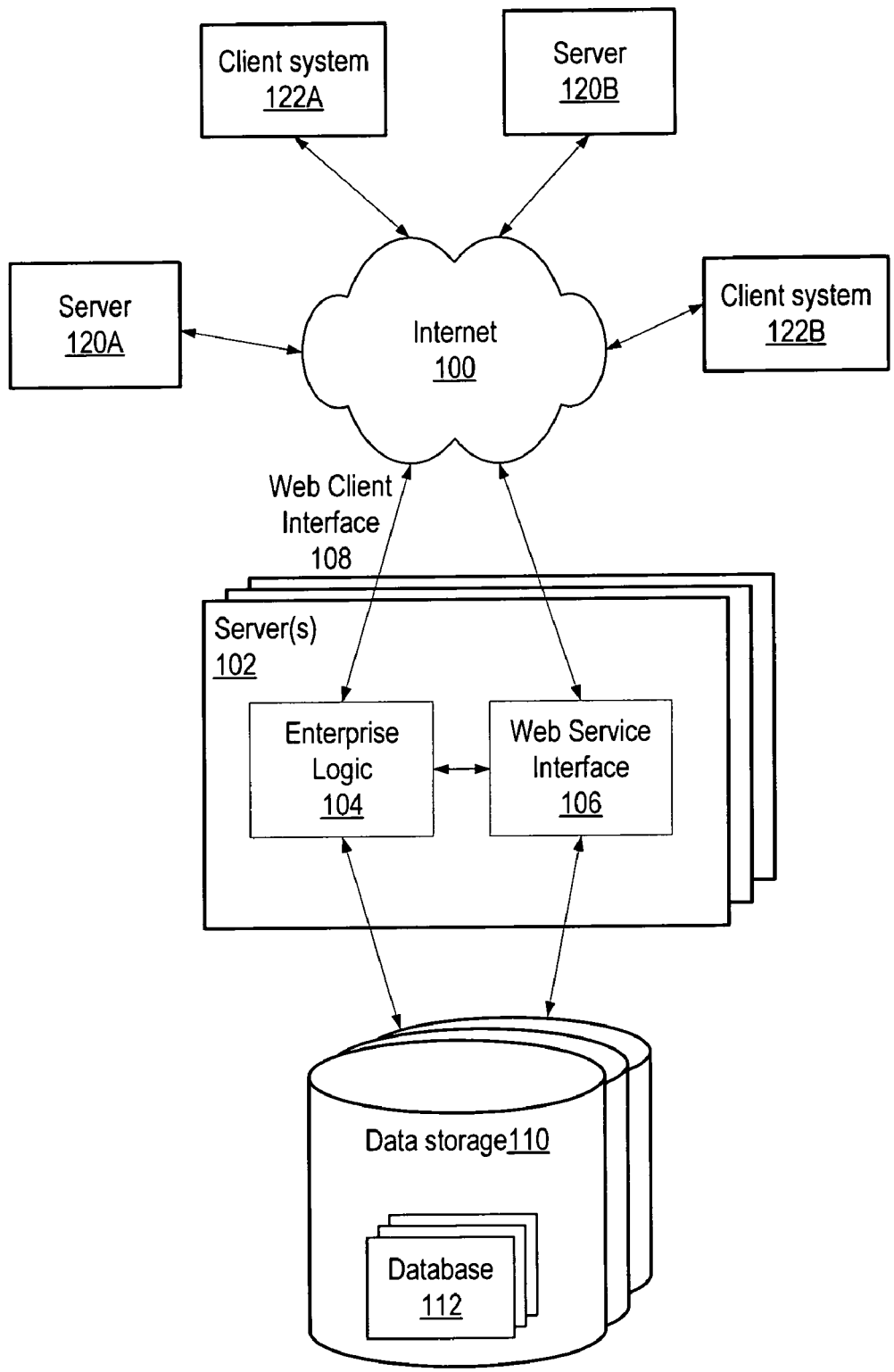
FIG. 1 is a block diagram that illustrates an exemplary system configuration that provides a Web service interface to the logic and/or data of a Web site.
Figure 2:
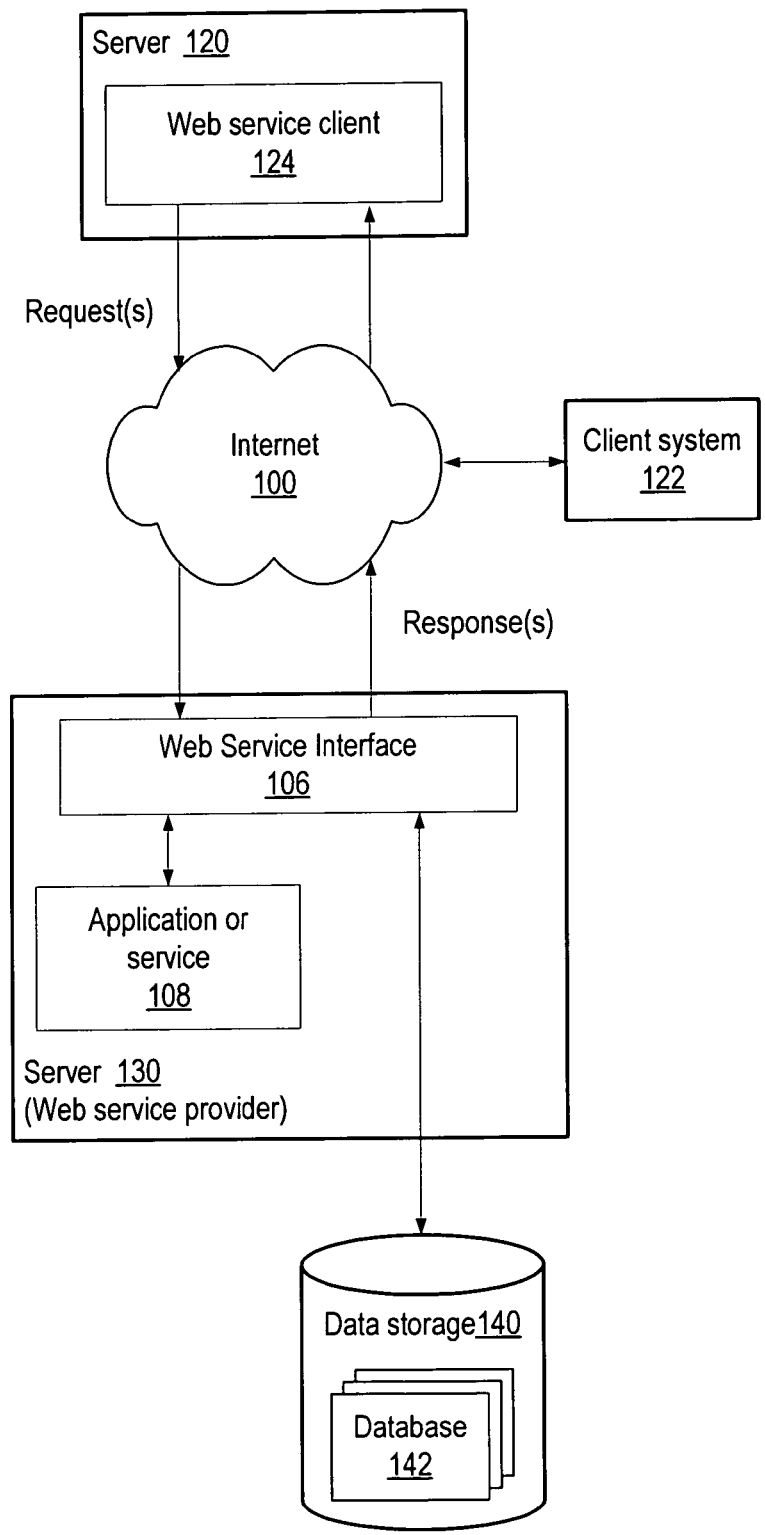
FIG. 2 is a block diagram that illustrates an exemplary system configuration that provides a Web service interface, and shows the interaction between a Web service client and Web service provider.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for programmatically inserting digital tracers in data that allow particular copies of the data to be traced to particular entities are described. Embodiments may provide a tracer mechanism that may programmatically insert individualized, human-perceivable additional or modified data (referred to herein as tracers) into excerpted copies of a work or portions of a collection of works (e.g., a product catalog or database) to be distributed to one or more recipients, such as Web service clients, typically under some sort of contract or agreement that may stipulate how the copies (referred to hereinafter as data copies) may be used and if and how the copies of the works may be redistributed. The inserted data, or tracer, appears as normal data to the casual reader, and does not interfere with the typical use of the data copy into which it is inserted. The data copies may be distributed to Web service clients via an electronic network and, more particularly, via a Web Service interface. The inserted individualized tracers may serve as unique identifiers for data copies accessed by or provided to particular Web service clients, allowing instances of the data copies located anywhere on the Web to be associated with particular Web service clients to which the data copies were originally provided.

Embodiment of the tracer mechanism may be used to track third party developers (for example, Web service clients) that obtain copies of particular portions of the data from an enterprise's data collection via a Web service interface under the terms of a licensing agreement. Within the particular portions of data, perceptible digital information (tracers) may be inserted that do not pollute or corrupt the data in any significant way. The third party developers may, in some cases, refurbish data received from the enterprise and sell it or redistribute it to some other party, possibly in violation of the terms of the licensing agreement.

An enterprise may potentially have thousands or even tens of thousands of third-party developers accessing its data collection through a Web service interface, so manually tracking data exposed by a Web service interface may be difficult if not impossible. Embodiments of the tracer mechanism may allow an enterprise to programmatically and systematically track the copies of data distributed to third party developers to help insure that the terms and conditions of the licensing agreements are not violated (e.g., by redistributing the data copies in violation of the agreement).

As an example, a licensing agreement may allow a third party to "ping" but not cache portions of data (data copies) from an enterprise (e.g., via a Web service interface); the entity may be charged for use of the data, for example on a per-ping basis. If the third party caches the data copies and possibly redistributes the data copies to other parties, the unauthorized instances of the data copies may be detected by the tracer mechanism on the Web by searching for a portion or all of the tracers inserted into the data copies distributed to the third party by the tracer mechanism. The tracers are generated by the tracer mechanism so that each data copy of a particular portion of data distributed to the third party is individualized to that particular data copy, so the tracer in a particular instance of a data copy may be used to identify the third party to which the data copy was originally distributed. From an individualized tracer in an instance of a data copy, the tracer mechanism may identify where, when, and to whom the data copy was originally distributed.

In one embodiment of the tracer mechanism, a tracer or tracers may be inserted into each data copy distributed to Web service clients. In other embodiments, rather than inserting tracer(s) into each distributed data copy, a tracer or tracers may be inserted into a subset of the data copies distributed to Web service clients, for example one out of every ten or one out of every one hundred data copies distributed to customers. Some embodiments of the tracer mechanism may systematically (as opposed to randomly) select which excerpt copies of data provided to various Web service clients receive inserted, individualized tracers and which ones do not. For example, in one embodiment, selection may be made based on risk profiles particular to the recipient, on the unique customer identifiers of the Web service clients, the quantity and variety of excerpt copies being requested by the Web service client(s), the time of day, geographic origin of the request, etc., or by any combination of these or other factors. Other embodiments may use a random mechanism to select which excerpt copies of data provided to various Web service clients receive tracers and which ones do not. Yet other embodiments may use a combination of a systematic and random mechanism to select which excerpt copies of data provided to various Web service clients receive tracers and which ones do not. One embodiment of the tracer mechanism may provide the ability to customize the tracers to particular requests for particular data and/or for particular Web service clients. In one embodiment, a user interface may be provided whereby an administrator may specify particular data copies in which tracer(s) are to be inserted and/or particular Web service clients that are to receive data copies with tracer(s) inserted.

Embodiments of the tracer mechanism may generate unique tracers for each excerpt copy of particular data to be provided to various Web service clients. Various embodiments may insert tracers of various lengths, from single items of data to entire paragraphs or pages of textual data. For example, embodiments may insert an entire fictitious product review (e.g. a review for a book, a movie, a music CD, a sporting goods item, etc.—reviews for any type of goods, product, or services) or a selection from a work, such as an individually modified selection from a book, as tracers, and/or may insert a single item of information or line of text, such as a fictitious phone number or fake cast member for a movie. In embodiments, the fictitious or modified content (the tracer) may be generated so as to make it difficult for the reader to spot the tracer. Note that longer inserts (longer tracers) may provides more opportunity for individual tailoring of the tracers; that is, a longer tracer can carry more "bits" of information to be used in identifying and tracing the particular excerpt copy of data with which the tracer is associated.

In one embodiment, to generate tracers such as fictional reviews of products, the tracer mechanism may access a database of generic tracer templates, such as a database of generic product review templates, together with a rule set that can "fill in" the templates to generate the specific tracers. For textual tracers such as product reviews, the templates may be written in such a way that the text may apply to any product, or to any product within a particular product category (e.g., any movie, any book, any music CD, any sporting goods item, etc.). Using product reviews as an example, the templates for the product reviews may be complete reviews or alternatively may be scripts generated from stock phrases, sentences, and/or paragraphs. The rule set may be used to insert the product name (or nickname, if available) in the appropriate places. In addition, the rule set may be used, for example, to select the number of rating stars and suitable modifier words or sentences to match, to produce a good or medium or poor review of the particular product. Using this mechanism, each inserted "tracer" review may be unique to the particular data copy to which it is attached and which is provided to a particular Web service client, thus making it more difficult for outsiders to spot the tracers and enabling the tracers to be used to "trace" or track the distribution of the particular data copy on the Internet, and to link instances of the particular data copy to the particular Web service client to which it was originally provided, even if an instance of the data copy is found on some other location on the network, such as a server/Web site other than one provided by the Web service client.

In one embodiment, the "bits" of an individual product review or other information inserted as a tracer may be represented by properties including one or more of, but not limited to: (a) which template is used to generate the tracer; (b) what customizations (e.g., product rating, reviewer name, stock filler phrases or sentences, etc.) are used when completing the particular tracer from the template; (c) to which customers (Web service clients) each template is applied, which may be determined by a customer identifier; and (d) where the resulting tracers are placed in the overall sequence of data (including other tracers) for each customer. One or more of these "bits", and possibly other information provided by the tracer, may provide a "signature" that may later be decoded to trace an instance of a data copy to a particular customer.

Embodiments of the tracer mechanism may include an automated detection mechanism that searches the Web for instances of data copies including individualized tracers that have been illicitly copied, for example to Web sites that are not covered by the terms and conditions for use of the material according to the agreement or contract between the Web service provider and the Web service clients that originally obtained the data copies. In one embodiment, the detection mechanism may perform a search of the Web using some third-party search engine for a particular phrase or phrases that may appear in one of the individualized tracers to generate a pool of candidate Web pages that may include the data copy with inserted tracer. The detection mechanism may then further examine these candidate Web pages to determine which ones actually include the data copy with inserted tracer. Once this subset of candidate Web pages is determined, the subset may be further examined to determine which of the Web pages, if any, include illicit or unauthorized instances of the data copy. Since the tracer, is individualized and thus linkable to the Web service client that originally obtained the copy, the tracer may be used to determine which of the Web sites include legitimate copies and which include illicit or unauthorized copies. This information may then, for example, be presented to the Web service client and/or to the entity or enterprise that possesses an illicit or unauthorized copy of the data copy to enforce the terms of the agreement between the Web service provider and/or to persuade the entity or enterprise that is in possession of the illicit copy to delete the copy or enter into a usage agreement with the Web service provider. This information could conceivably be used as evidence of copyright infringement in a legal action, if necessary.

In one embodiment, the tracer mechanism may be a Web service with a Web service interface that allows Web service clients to access the tracer mechanism through the Web service interface to insert individualized tracers into data copies, for example data copies extracted from third-party works or collections, and to access the detection mechanism of the tracer mechanism to detect illicit or unauthorized instances of the data copies on the Web.

While embodiments of the tracer mechanism are generally described herein as being used to insert tracers into data copies distributed via a Web service interface and for tracking instances of those data copies on the Web, note that embodiments of the tracer mechanism may be used with other mechanisms for distributing data than Web services. For example, embodiments of the tracer mechanism may be used to insert individualized tracers into data accessed on a Web site through a Web client interface by clients using Web browsers. An individualized tracer may be inserted into particular data accessed by a client using a Web browser, and illicit copies of the data detected on the Web that include the individualized tracer may be traced back to the client using the tracer, for example by associating the tracer with the IP address from which the data was originally accessed, or by associating a unique customer identifier provided to the client when the client registered with the Web site with the tracer.

While the tracers generated by the tracer mechanism and inserted into data copies are generally described herein as being visible or perceptible, embodiments of the tracer mechanism may be used to insert invisible tracers into data copies as well.

Figure 3:
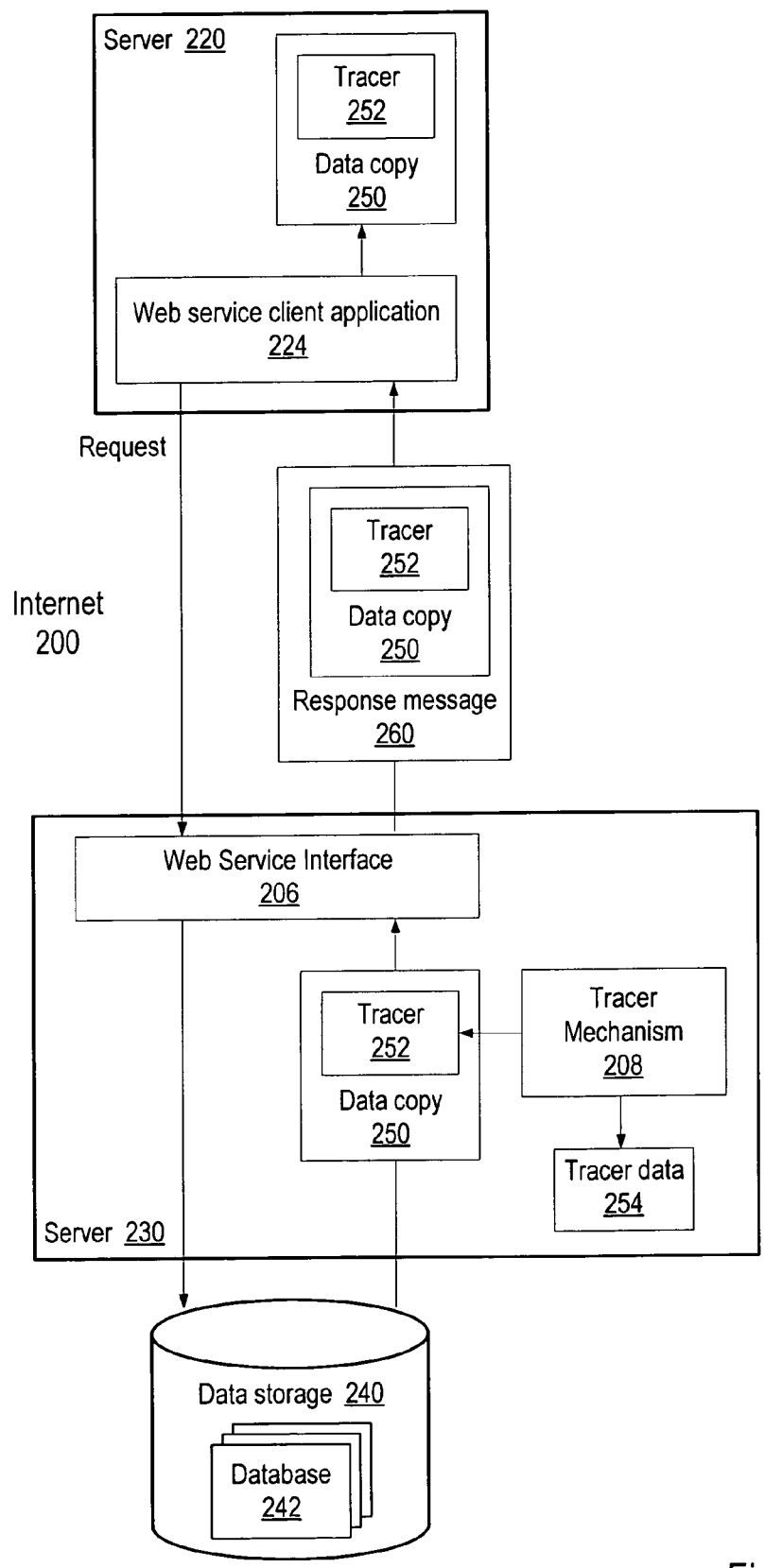
FIG. 3 illustrates an exemplary system configuration that provides a Web service interface, and shows the interaction between a Web service client application and a Web service provider that provides at least some copies of data to Web service client applications with individualized tracers inserted according to one embodiment.

FIG. 3 illustrates an exemplary system configuration that provides a Web service interface, and shows the interaction between a Web service client application and a Web service provider that provides at least some copies of data to Web service client applications with individualized tracers inserted according to one embodiment. In this example, a Web service interface 206 may be implemented on a server 230 coupled to Internet 200. This server 230 may be referred to as the "Web service provider". Server 230 may be coupled to data storage 240 for storing information in database 242. Database 242 may include any type or types of data, including, but not limited to, textual data, graphical data (images), audio data, movie or video clips, or combinations thereof. As another example, database 242 may include data stored as Web pages for display on a Web site provided by the Web service provider. These Web pages may include, for example, item detail pages for products offered for sale by the Web service provider.

Server 220 may be coupled to Internet 200. Server 220 may host a Web service client application 224. Web service client application 224 may be configured to programmatically access database 242 via Web service interface 206. Note that Web service interface does not provide a Web browser interface, but instead provides a programmatic interface via an API through which at least some content of database 242 may be programmatically accessed and copied by Web service client application 224 under a licensing agreement with the enterprise that owns the data in database 242. Server 220 may, for example, provide a Web site accessible to client(s) via Web browsers, and Web service client application 224 may be configured to access and copy at least some content of database 242 via Web service interface 206 to provide access to the copied content to the clients under a licensing agreement with the enterprise that owns the data in database 242.

To access and copy particular data provided by the Web service provider 230, Web service client application 224 may send a request message to Web service interface 206 via Internet 200. Web service provider 230 may then process the request by accessing the indicated data in database 242. A copy of the requested data 250 may be generated. Tracer mechanism 208 may then generate an individualized tracer 252 (for example, from a tracer template) for this particular data copy 250 and insert or append the tracer 252 in or to the data copy 250. Tracer mechanism 208 may store information in tracer data 254 that associates the individualized tracer 252 with the particular Web service request and/or with the Web service client application 224. This information may later be used to identify instances of the particular data copy 250 and to link the instances of data copy 250 to the Web service client application 224. Web service interface 206 may return the data copy 250 with tracer 252 inserted to the Web service client application 224 in a response message 260 via Internet 200.

As previously mentioned, database 242 may include any type or types of data, including, but not limited to, textual, graphical, audio, and video data, or combinations thereof. Data copy 250 may be an excerpted copy of a portion of the data in the database 242 or an excerpted copy of a portion of the data from a subset of the database 242. Data copy 250 may be textual, graphical, video, or audio data, or a combination thereof. Data copy 250 may be, for example, all or a portion of a Web page, for example an item detail page for a product offered for sale by the Web service provider.

Tracer 252 may be textual, graphical, video, or audio data that is unique to the particular data copy 250 into which it is inserted. In one embodiment, the tracer 252 may be a permutation generated from a template and thus may be similar, but not identical, to other individualized tracers 252 inserted into other copies of the extracted data provided to other Web service clients. An example of inserted textual data as a tracer is an individualized product review on an item detail page or other type of Web page. An example of inserted graphical data as a tracer is an individualized image of a product or item inserted into an item detail page or other type of Web page. An example of inserted audio data as a tracer is an individualized audio clip inserted into an item detail page or other type of Web page. An example of inserted video data is inserted individualized fictitious frames or duplicate frames in a video clip to be used as a tracer.

Note that, in one embodiment, instead of inserting an entire fictitious tracer into the content of a data copy, an individualized tracer may be inserted into existing content of the data; for example an individualized tracer paragraph or sentence may be inserted into an existing review, or alternatively existing content may be individually modified to be used as a tracer; for example, synonyms may be substituted for particular words in a product review, with different combinations of synonyms being used for each data copy containing the product review provided to different Web service clients. Other mechanisms than synonyms may be used; for example, particular words may be deliberately misspelled, or alternative spellings or punctuations may be used. Or combinations may be used; for example, two or more alternative synonyms may be used at one or more particular word positions and two or more alternative spellings may be used for other words in text to be used as an individualized tracer. As another example, a graphical image or an audio clip may be slightly altered to generate an individualized tracer.

For images or audio clips, in one embodiment, multiple images or audio clips, for example images of a product, may be maintained. One particular image or audio clip may be included in most copies of particular data, for example in an item detail page for a product. For systematically or randomly selected copies of the data, an alternate image or audio clip may be inserted by the tracer mechanism as an individualized tracer. Note that, for images, typically the Web service does not return a copy of the image to the Web service client, but instead returns a' link to the image. Therefore, in one embodiment, a link to a "customized" tracer image may be returned to the Web service client.

FIG. 4 illustrates exemplary tracer data 254 that may be generated and used by a tracer mechanism according to one embodiment, and is not intended to be limiting. For each copy of extracted data distributed to Web service clients, an entry may be made in tracer data 254. Each entry may include one or more of, but is not limited to, information uniquely identifying or that can be used to uniquely identify the particular Web service client (such as a unique customer identifier assigned to the Web service client), the particular excerpt of the content of database 242 (e.g., a particular Web page or product review) that was provided to the Web service client, and the particular permutation of the tracer that was inserted into the data copy. Other relevant information, such as time stamps, may also be stored in tracer data 254. In one embodiment, tracer data 254 may include information that may be used to link an entry in tracer data 254 with a particular tracer template. Tracer data 254 may be stored as a file or in a database of some sort, such as a relational database.

A data copy identifier, the information that may be used to identify particular excerpts of the content of database 242 (e.g., a particular Web page) that was provided to a Web service client, may be any information that may be used to uniquely identify excerpts of content from database 242. This information may be a database index, a title, a descriptive string, a Web page identifier, or any other data that may be used to identify particular excerpts of the content of database 242, or a combination of two or more such data items. Note that this information identifies the excerpted content, but does not distinguish between different copies of the excerpted content provided to different Web service clients.

A tracer identifier may be or may include the information that may be used to identify a particular permutation of a tracer that was inserted into a data copy. In one embodiment, the tracer identifier may be the individualized tracer itself. In another embodiment, the tracer identifier may be or may include a unique set of data that was used to generate the individualized tracer as a permutation of a tracer template. For example, if the tracer is generated by permuting a set of synonyms in textual content, such as a fictitious product review, the tracer identifier may be the "permutation code" for this particular permutation. As an example, if there are twenty word positions in a fictitious product review "template" into each of which one of two different synonyms may be inserted by the tracer mechanism to generate an individualized tracer, an exemplary permutation code for a particular permutation may be "11011001111010011111", with each digit representing which of the two synonyms for that word position was used in this permutation. Note that, in this embodiment, the tracer mechanism may access the stored tracer template information and apply the tracer identifier from tracer data 254 to the tracer template information to regenerate the tracer when searching for instances of the data copy including the particular individualized tracer on the Web.

FIG. 5A illustrates an exemplary product review as an exemplary tracer template, permutations of which may be programmatically generated by the tracer mechanism and inserted into copies of particular data distributed to Web service client applications as individualized tracers that may be linked to particular Web service client applications according to one embodiment, and is not intended to be limiting. In this example, an individualized tracer for a particular excerpt of the content of database 242 may be generated by permuting a set of synonyms in textual content. As an example, there may be twenty word positions in the fictitious product review "template" into each of which one of two different synonyms may be inserted by the tracer mechanism to generate an individualized tracer. An exemplary permutation code for a particular permutation may be "11011001111010011111", with each digit representing which of the two synonyms at that word position was used in this permutation. Twenty word positions with two synonyms for each word position yields 1,048,576 permutations of the tracer template that may be used. Note that, in embodiments, various numbers of word positions in a tracer template and/or numbers of synonyms at each word position may be used to yield different numbers of permutations. Simply adding one more word position with two synonyms doubles the numbers of permutations. Some embodiments may provide a user interface that allows the numbers of word positions and/or synonyms to be adjusted as necessary or desired.

While the above example describes a tracer template that uses word positions and synonyms to generate permutations of the tracer template to be used as individualized textual tracers, note that other mechanisms may be used by the tracer mechanism to generate individualized textual tracers, such as alternative spellings and alternative punctuations, or combinations of mechanisms may be used. Also note that, while the above example describes a "fictitious product review" tracer template, the same or a similar mechanism may be applied to other types of textual content, such as fictitious paragraphs in book excerpts, product descriptions, recommendations, or even to "real" content such as an actual paragraph from a book, technical manual, or other work. Further, note that a similar method using permutations of positions in data and "synonyms" or some other mechanism for the positions may be used to generate individualized tracers from tracer templates for other types of data, such as graphical or audio data.

While tracer templates are generally described as being used to generate individualized tracers for particular excerpts of the content of database 242, in one embodiment, the same tracer template may be used to generate individualized tracers for different excerpts of the content of database 242. For example, permutations of the same generic fictitious product review may be inserted into data copies containing information on different products excerpted from the database 242. In one embodiment, information that customizes the generic tracer template to the particular excerpted content, such as a book or movie title, may be inserted into the generic tracer template at a predetermined position (see FIG. 5B for an example). In one embodiment, the same permutation of the tracer template (the same tracer) may appear in data copy instances of two or more different excerpts of the content of database 242, but not in different data copy instances of the same excerpt. In another embodiment, each data copy instance of each different excerpt may receive a unique permutation of the tracer template (i.e., a unique tracer).

Figure 6A:
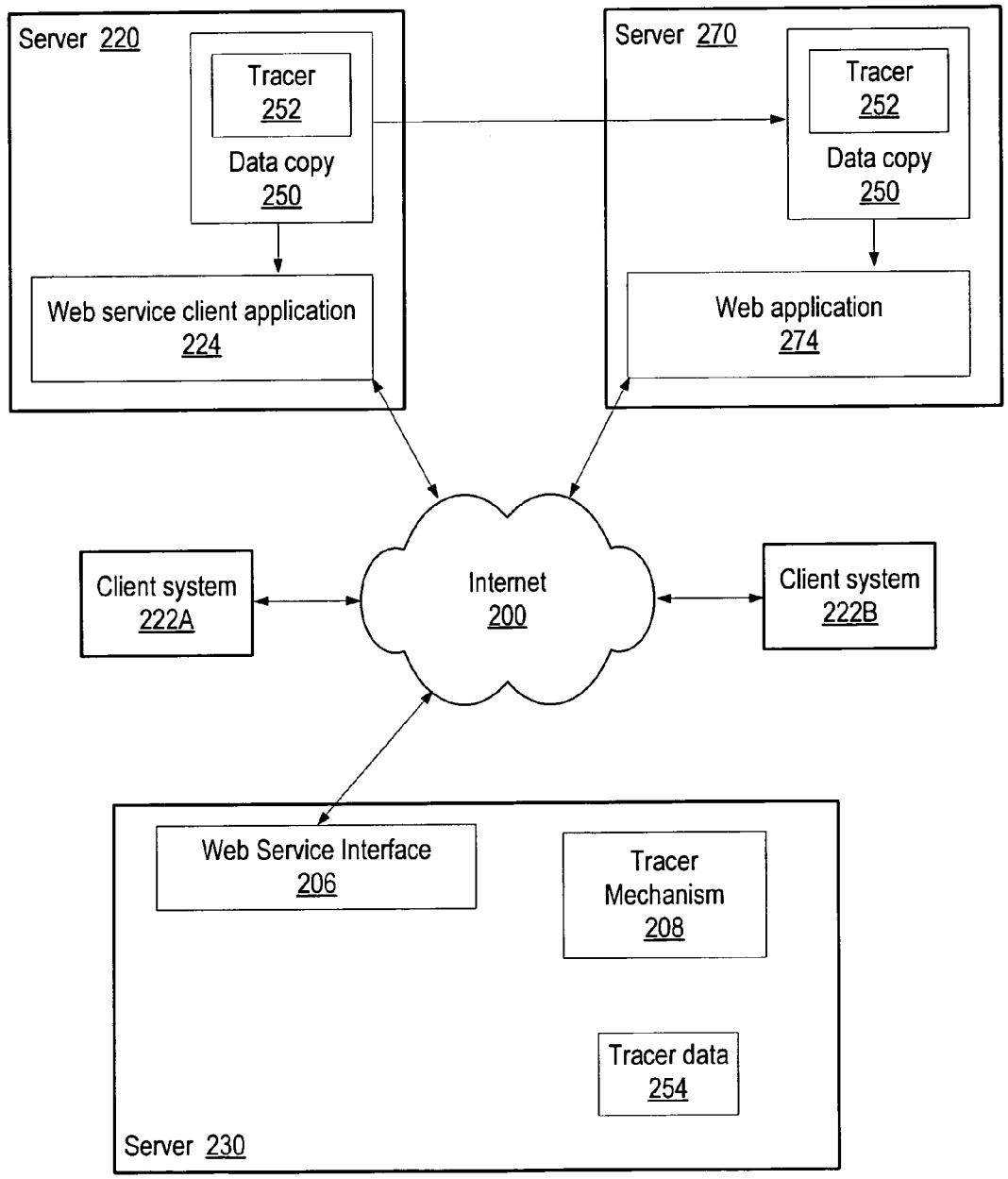
FIG. 6A illustrates the exemplary Web service client application of FIG. 3 providing a data copy with tracer inserted to another Server on the Web according to one embodiment.

FIG. 6A illustrates the exemplary Web service client application of FIG. 3 providing a data copy with tracer inserted to another Server on the Web according to one embodiment. Web service client application 224 may obtain data copy 250 including inserted individualized tracer 252 from the Web service provider via Web service interface 206 as described in FIG. 3, and according to some usage agreement with the Web service provider that may, for example, specify if the data copy 250 can be redistributed, and the conditions under which redistribution may occur if permitted. Data copy 250 may, for example, be stored to a storage device or storage system accessible to server 220. Data copy 250 may, for example, be made available through a Web site, to one or more client systems 222 according to the terms of the agreement with the Web service provider. Using these client systems 222, users may access and view the data copy 250 stored on server 220, for example using a Web browser.

Data copy 250, along with its inserted individualized tracer 252, may be copied onto another system, such as server 270 in this example. This copying may be done with the knowledge and cooperation of the operators of server 220, which may be in violation of the usage agreement with the Web service provider from which data copy 250 was obtained, or alternatively may be illicitly copied by an operator of server 270, which potentially violates the copyright for the data copy 250 owned by the Web service provider. Server 270 may be a Web server that itself includes a Web application that may, for example, provide a Web site through which data copy 250 may be made accessible to client systems 222, but which also makes it accessible from server 220.

Figure 6B:
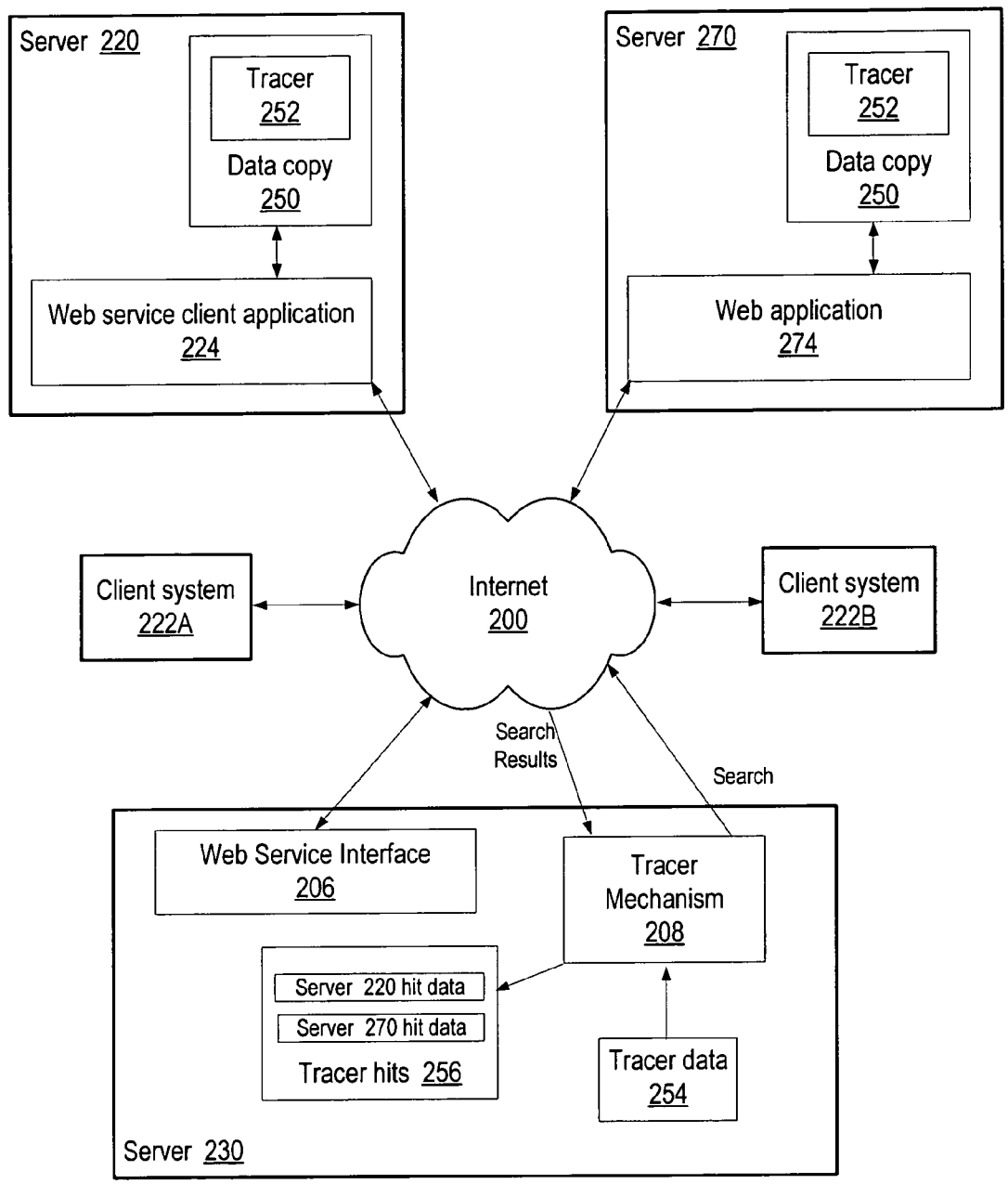
FIG. 6B illustrates the tracer mechanism of the exemplary Web service provider illustrated in FIG. 3 searching for instances of the data copy that was provided to the Web service client application through the Web service interface, according to one embodiment.

FIG. 6B illustrates the tracer mechanism of the exemplary Web service provider illustrated in FIG. 3 searching for instances of the data copy that was provided to the Web service client application through the Web service interface, according to one embodiment. In one embodiment, tracer mechanism 208 may periodically or aperiodically search the Web for the individualized tracer 252 associated with data copy 250 which may have been (legitimately or illicitly) copied, for example to Web servers that are not covered by the terms and conditions for use of the data copy 250 according to the agreement or contract between the Web service provider and the Web service client that originally obtained the data copy 250 via access of Web service interface 206 by Web service client application 224, as illustrated in FIG. 3. These searches may be scheduled to run periodically or aperiodically, or alternatively searches may be manually initiated if desired.

In one embodiment, the tracer mechanism may access tracer data 254 and possibly other information such as template information to perform a search of the Web using a search engine for a particular portion of the tracer 252, such as a phrase or phrases from a textual tracer, or alternatively for the entire tracer 252, to generate a pool of candidate Web pages, Web servers, or other Web entities (tracer hits 256) that may include an instance of data copy 250 with inserted tracer 252. The tracer mechanism may then further examine these candidate Web entities to determine which ones actually include the data copy 250 with inserted tracer 252, if necessary. Once this subset of candidate Web entities is determined, the subset may be further examined, using tracer data 254, to determine which of the Web entities, if any, actually include illicit or unauthorized instances of the data copy 250. Since the tracer 252 is individualized and thus linkable to the Web service client application 224 that originally obtained the data copy 250 using tracer data 254, the tracer 252 may be used to determine which of the Web entities include legitimate instances of data copy 252 and which include illicit or unauthorized instances of data copy 252. Some or all of the information on the "hits" found by tracer mechanism 208 may be displayed or printed for viewing by an operator and/or administrator. This information may then, for example, be presented to the Web service client and/or to the entity or enterprise that possesses an illicit instance of the data copy to enforce the terms of the agreement between the Web service provider and/or to persuade the entity or enterprise that is in possession of the illicit instance of copy data 250 to delete the instance or enter into a usage agreement with the Web service provider. This information could conceivably be used as evidence of copyright infringement in a legal action, if necessary.

In this example, tracer mechanism 208 may get tracer hits 256 on server 220 and server 270, and possibly other servers or systems on the Web. These hits may be analyzed using tracer data 254 and possibly other information, such as information describing the terms of the agreement between the Web service provider and the Web service client as to if and to where the data copy 250 may be redistributed, to determine if any of the "hits" are for illegitimate instances of data copy 250. In this example, the hit on server 270 may be flagged as an illegitimate instance of data copy 250. This information may be provided to an operator and/or administrator, who may then initiate an appropriate response to the owners of server 220 and/or server 270, or whatever other parties may be involved.

In one embodiment, rather than maintaining tracer data 254 and using tracer data 254 to associate instances of data copies with particular Web service clients as described above, tracers 252 may be synthesized in such a way that the tracer mechanism may "reverse engineer" a tracer to determine the particular Web service client to which a data copy containing the tracer was originally distributed.

Figure 7:
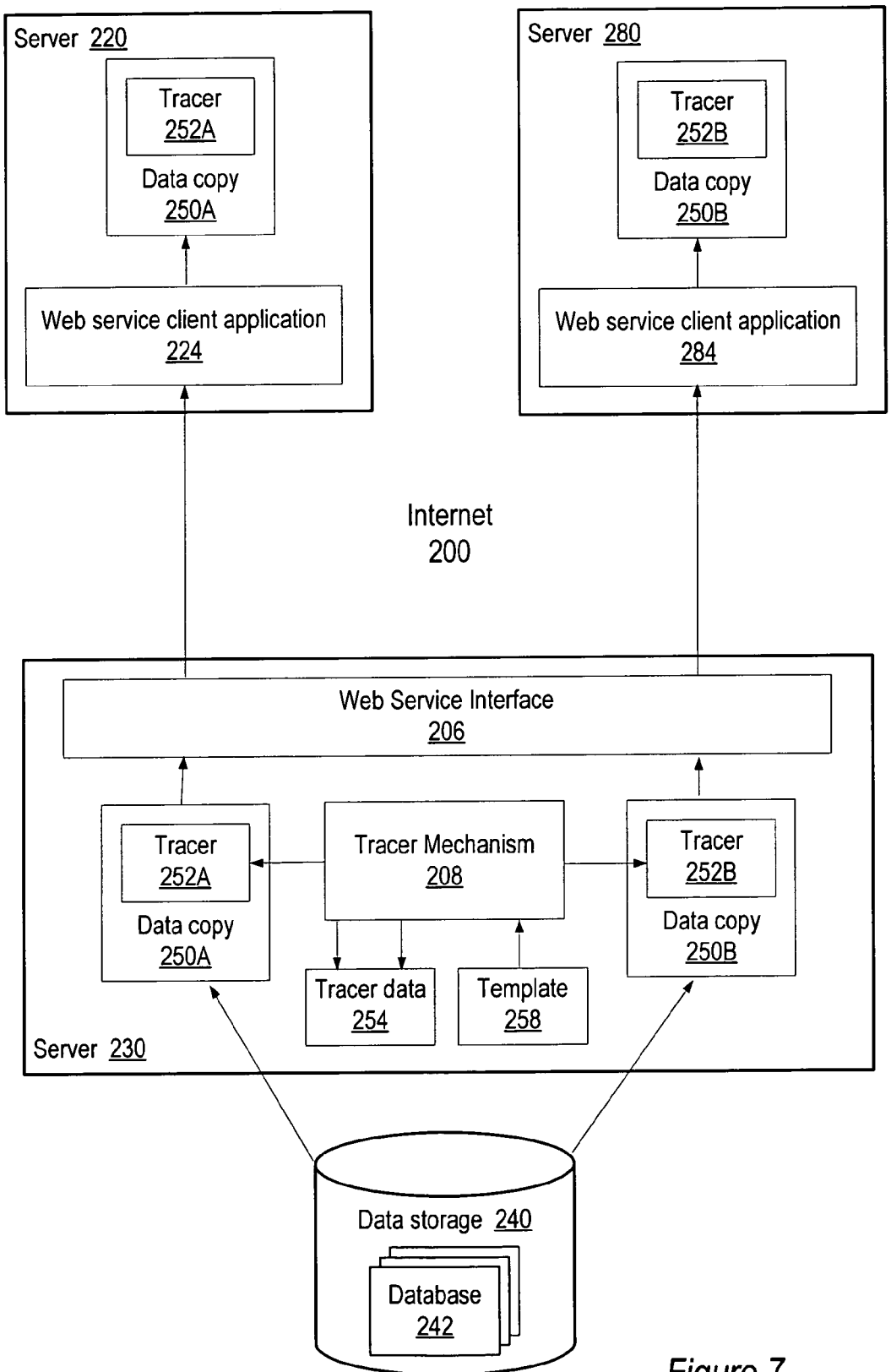
FIG. 7 illustrates a Web service provider providing data copies of the same content, each including an individualized tracer generated from a tracer template, to different Web service client applications according to one embodiment.

FIG. 7 illustrates a Web service provider providing data copies of the same content, each including an individualized tracer generated from a tracer template, to different Web service client applications according to one embodiment. To access and copy particular content provided by the Web service provider, each Web service client application, applications 224 and 284 in this example, may send a request message to Web service interface 206 via Internet 200. Note that, while FIG. 7 illustrates the two requests being processed essentially in parallel, the requests may be received at different times and processed separately and serially. The Web service may process each request by accessing the indicated data in database 242. A different copy of the requested data, data copies 250A and 250B, may be generated in response to each request. Tracer mechanism 208 may generate an individualized tracer 252A for data copy 250A and an individualized tracer 252B for data copy 250B. In one embodiment, the individualized tracers 250 may be generated as unique permutations of a tracer template 258 as previously described herein. The generated individualized tracers 252 may be inserted in or appended to their respective data copies 250. Tracer mechanism 208 may store information that associates each individualized tracer 252 with the particular Web service client application that receives the tracer 252 in tracer data 254. This information may later be used to locate instances of the data copies 250A and 250B and to link particular instances of the data copies 250A and 250B to the particular Web service client application that received the data copy 250. Web service interface 206 may return the data copies 250 with their individualized tracers 252 to the Web service client applications in response messages via Internet 200.

Figure 8:
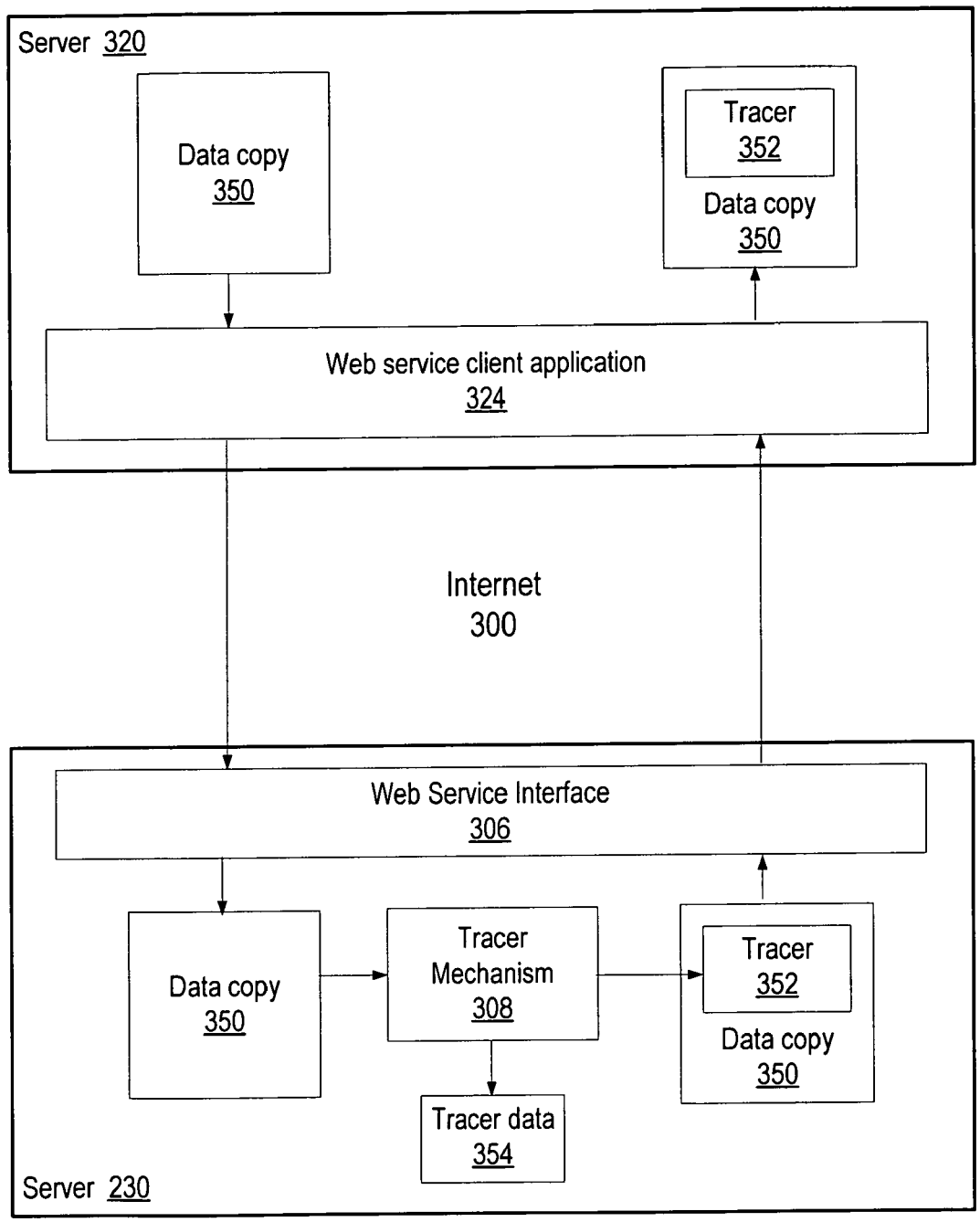
FIG. 8 illustrates an exemplary tracer mechanism implemented as a Web service with a Web service interface according to one embodiment.

FIG. 8 illustrates an exemplary tracer mechanism implemented as a Web service with a Web service interface according to one embodiment. In this embodiment, tracer mechanism 308 may be a Web service with a Web service interface 306 that allows Web service clients such as Web service client application 324 to access the tracer mechanism 308 through the Web service interface 206 to insert individualized tracers 352 into data copies 350 provided by the Web service client, for example data copies of content extracted from third-party works or collections, and to access the tracer mechanism 308 to search for and detect illicit or unauthorized instances of the data copies 350 with inserted tracers 352 on the Web, as previously described herein.

In this example, Web service client application 324 may send data copy 350 to Web service interface 306 in one or more messages. Web service client application 324 may also send information identifying a client of the Web service client application 324 that is to receive the particular data copy 350. Tracer mechanism 308 may then insert an individualized tracer 352 into data copy 350, and store information on the tracer in tracer data 354, including information on the client that is to receive the data copy. The individualized tracer 352 may, for example, be generated as a permutation of a tracer template, as previously described. Web service interface 306 may then return data copy 350 with inserted individualized tracer 352 to Web service client application 324. Alternatively, Web service interface 306 may instead forward data copy 350 with inserted individualized tracer 352 to the client of Server 320 for which the data copy 350 is intended. Tracer mechanism 308 may be programmed to periodically or aperiodically search the Web for (legitimate and illegitimate) instances of data copy 350 with inserted individualized tracer 352, and to report the results of the search back to Web service client application 324 via Web service interface 306. Alternatively, Web service client application 324 may periodically or aperiodically request that a search for individualized tracer 352 be performed via Web service interface 306.

Note that, while FIG. 8 illustrates an exemplary tracer mechanism implemented as a Web service that provides a Web service interface to the functions of the tracer mechanism for clients of the Web service, embodiments of the tracer mechanism may be implemented according to other architectures than a Web services architecture, for example as a server-hosted application accessible by clients according to a client/server architecture, as a service offered by one or more peer nodes in a peer-to-peer networking environment, or in general as one or more modules, services, and/or applications on a system accessible via an API to other modules, services or applications on the same system and/or on other systems coupled to the system via a network interface or some other communications interface.

Figure 9:
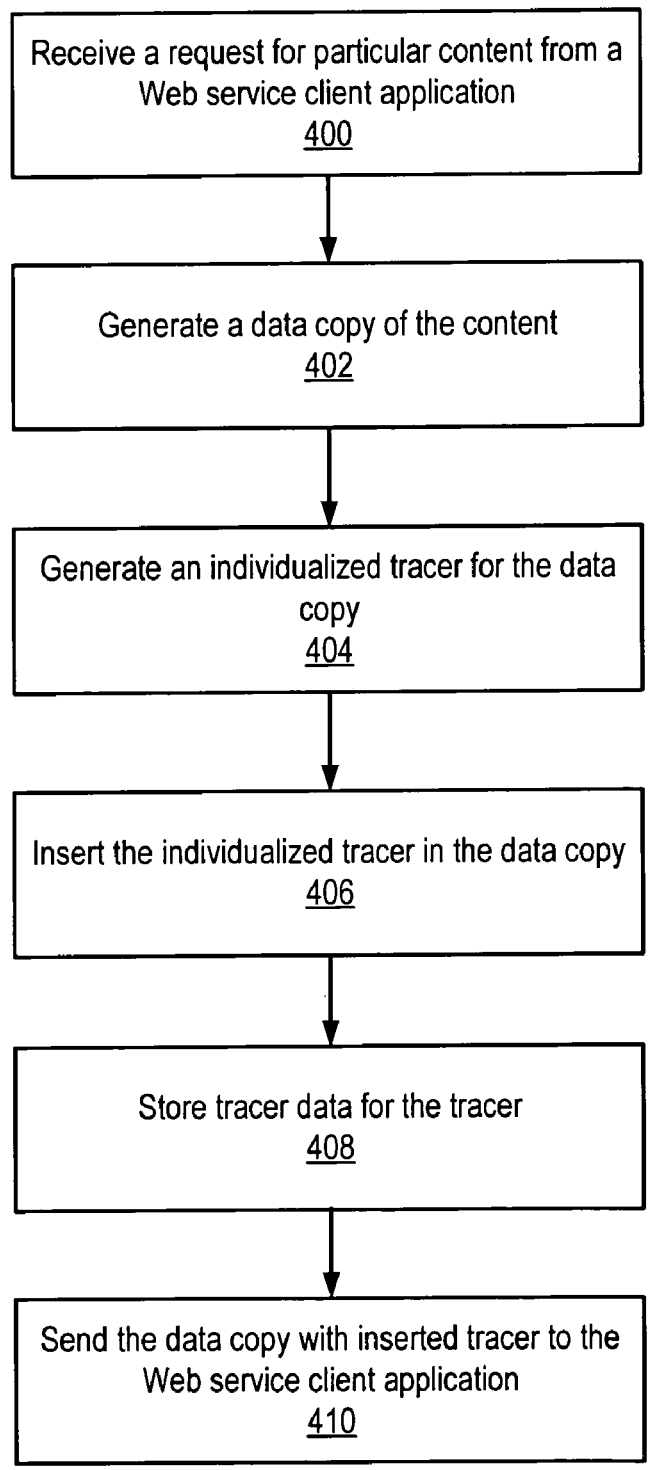
FIG. 9 is a flowchart illustrating a method of inserting individualized tracers in particular data copies according to one embodiment.

FIG. 9 is a flowchart illustrating a method of inserting individualized tracers in particular data copies according to one embodiment. As indicated at 400, a Web service interface may receive a request for particular content of a database from a Web service client application, typically under an agreement that may specify how the data may be used and if the data copy may or may not be redistributed, and if so under what terms and conditions. As indicated at 402, the Web service may generate a data copy of the requested content. As indicated at 404, the tracer mechanism may generate an individualized tracer for the data copy. The individualized tracer may be used to link the particular data copy to the Web service client application that receives the copy. In one embodiment, the individualized tracer may be generated as a permutation of a tracer template associated with the particular content of which the data copy was made, such as a template for a fictitious product review. The individualized tracer may then be inserted in the data copy as indicated at 406. Information on the individualized tracer may be used, for example to link instances of the data copy including the individualized tracer and discovered by the tracer mechanism to the Web service client application that initially receives the data copy. As indicated at 410, the Web service interface may then send the data copy with the inserted individualized tracer to the Web service client application.

Figure 10:
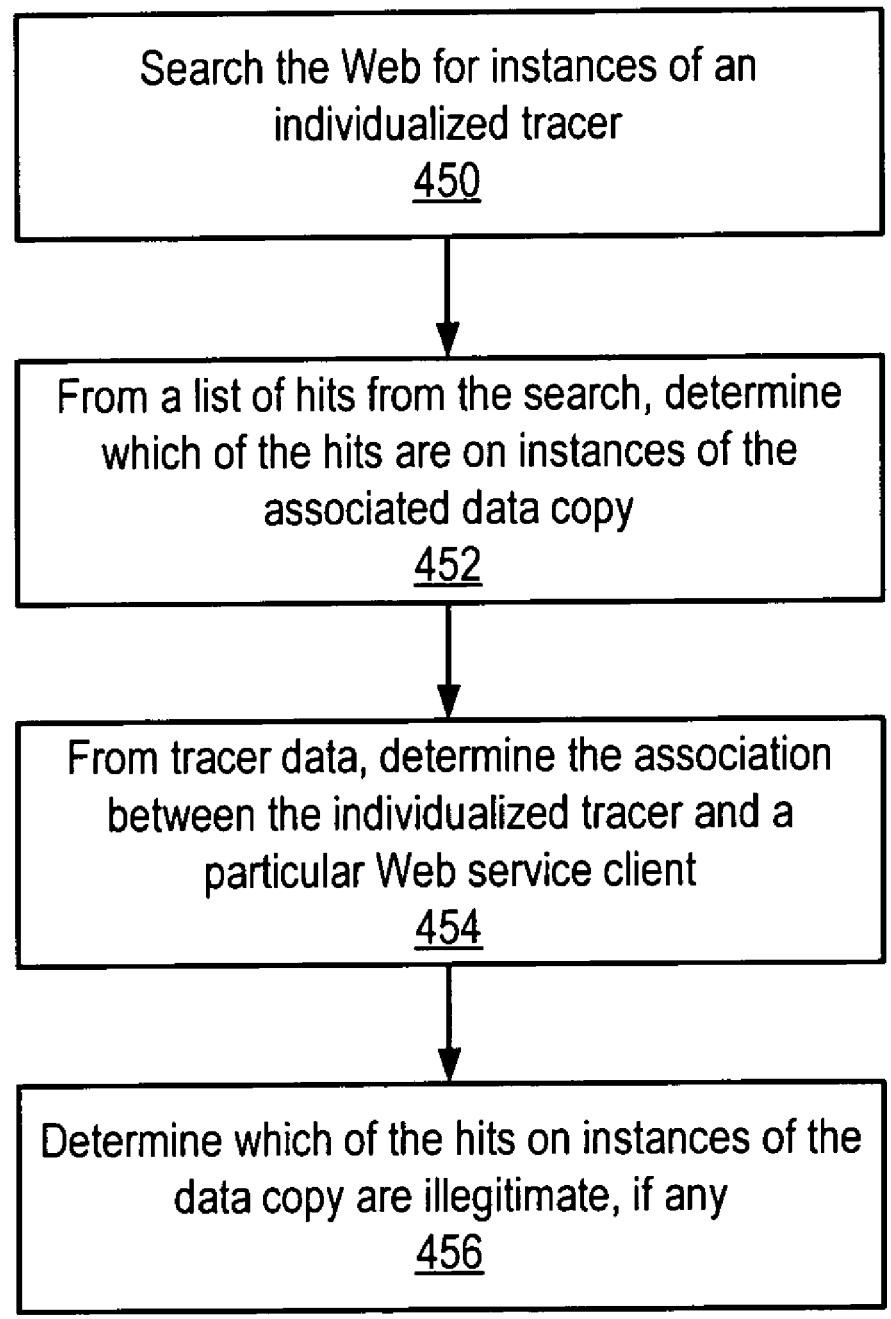
FIG. 10 is a flowchart illustrating a method for detecting data copies on the Web that include individualized tracers, and for linking those detected data copies to particular Web service clients, according to one embodiment.

FIG. 10 is a flowchart illustrating a method for detecting data copies on the Web that include individualized tracers, and for linking those detected data copies to particular Web service clients, according to one embodiment. As indicated at 450, the tracer mechanism may search the Web for "hits" on instances of an individualized tracer. From a list of hits generated by the search, the tracer mechanism may determine which of the hits are actually on instances of the associated data copy, as indicated at 452. The tracer mechanism may use the stored tracer data and possibly other data to determine the association between the individualized tracer and a particular Web service client, as indicated at 454. As indicated at 456, the hits on the instances of the data copy associated with the individualized tracer may be further examined, using this information, to determine which, if any, of the hits on instances of the data copy are illegitimate, if any. This information may then be used to enforce terms of an agreement between the Web service provider and the Web service client and/or to pursue copyright violations, if desired.

Exemplary System

Figure 11:
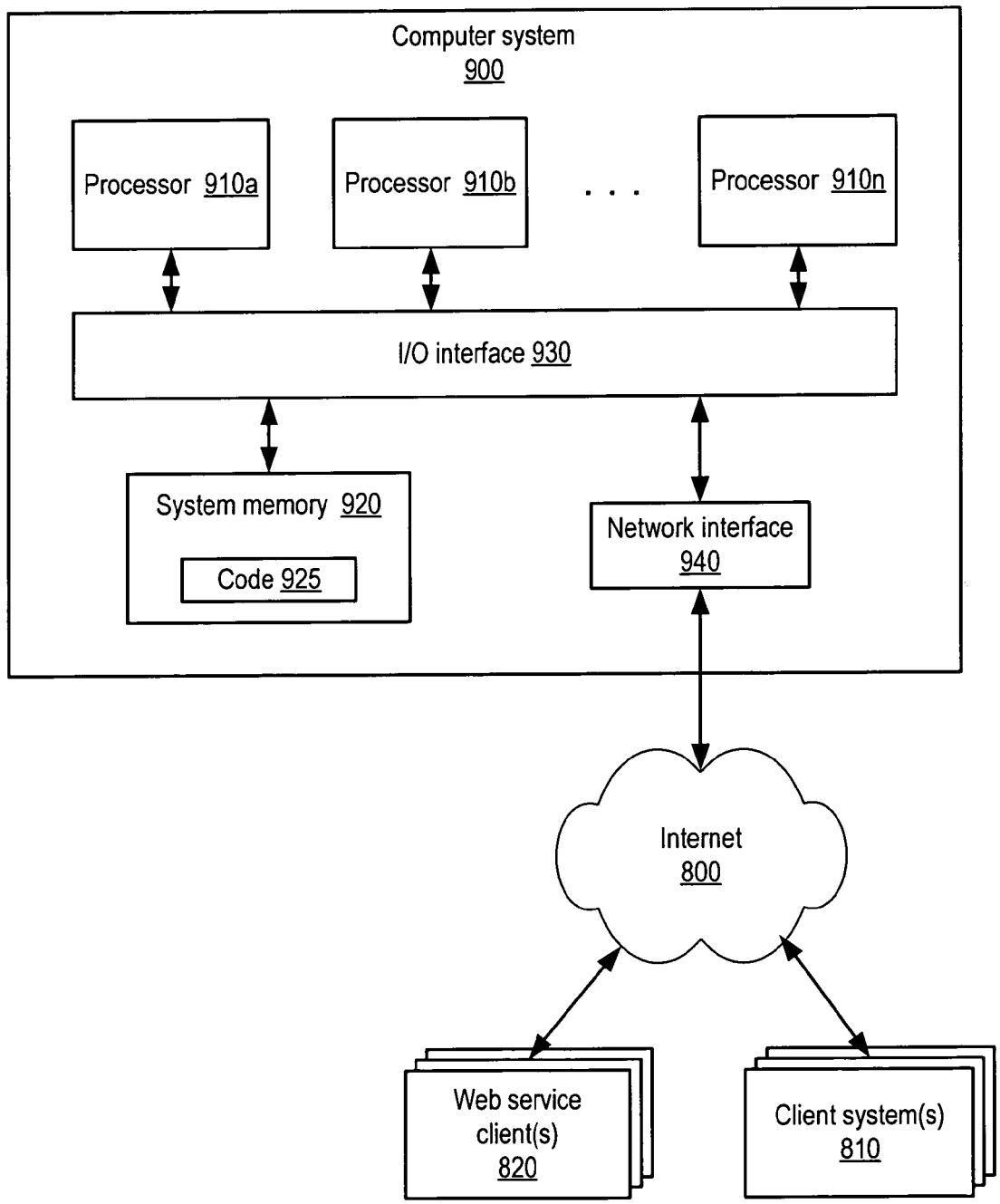
FIG. 11 is a block diagram illustrating an exemplary embodiment of a computer system.

In one embodiment, a Web server that implements one or more components of a Web service tracer mechanism as described herein may include a general-purpose computer system that includes or is configured to access one or more computer-accessible media, such as computer system 900 illustrated in FIG. 11. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for an e-commerce Web site of an electronic commerce enterprise that implements a subscription-based shipping program, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In particular, network interface 940 may be configured to allow communication between computer system 900 and other computer systems hosting Web services and Web service clients on the Internet. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 3 through 10 for implementing a Web service implemented a tracer mechanism for inserting individualized tracers into copies of data extracted from a database and provided to Web service clients 820 and for searching for illegitimate data copies including the individualized tracers. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a processor; and
   a memory comprising program instructions, wherein the program instructions are executable by the processor to perform:
   receiving a request for particular data of a data collection from a Web service client via a network;
   extracting a copy of the requested particular data from the data collection as an original data copy of the particular data;
   determining a tracer identifier for the original data copy, wherein the tracer identifier identifies at least one location within the original data copy and further identifies one or more tracer elements to be positioned at the identified at least one location;
   wherein determining the tracer identifier further comprising determining the tracer identifier as a permutation of a tracer template, wherein the permutation includes digits and said digits representing the at least one location of the tracer elements;
   marking the original data copy as identified by the tracer identifier, wherein said marking comprises positioning the one or more tracer elements at the identified at least one location within the original data copy, and wherein:
   the one or more tracer elements are perceptible to a user during normal presentation of the marked data copy; and
   the marked data copy appears to the user to be an unmarked copy of the requested particular data;
   storing the tracer identifier for the marked data copy, wherein the stored tracer identifier links the marked data copy to the Web service client;
   returning the marked data copy to the Web service client; and
   repeating said receiving, said determining, said marking, said storing, and said returning for the same particular data for a different Web service client, wherein the tracer identifier for the Web service client and the tracer identifier for the different Web service client are different;
   wherein said receiving, said extracting, said determining, said marking, said storing, said returning, and said repeating are all performed by a same Web service provider separate from the Web service client.

2. The system as recited in claim 1, wherein the tracer identifier is unique to the Web service client to which the marked data copy of the particular data is returned.

3. The system as recited in claim 1, wherein the tracer identifier further links the marked data copy of the particular data with the request for the particular data received from the Web service client.

4. The system as recited in claim 1, wherein the program instructions are further executable by the processor to:
   periodically or aperiodically search the network for instances of at least a portion of the one or more tracer elements to generate a list of possible hits on instances of the marked data copy that was returned to the Web service client;

determine from the list of possible hits a subset of the hits that are on instances of the marked data copy on the network; and determine if any of the hits from the subset of the hits are on unauthorized instances of the marked data copy.

5. The system as recited in claim 4, wherein, to determine if any of the hits from the subset of the hits are on unauthorized instances of the marked data copy, the Web service client is associated with the instances of the marked data copy according to the tracer identifier.

6. The system as recited in claim 1, wherein the program instructions are further executable by the processor to:
receive a request for the particular data of the data collection from another Web service client via the network;
extract another copy of the requested particular data from the data collection as the original data copy of the particular data;
determine another tracer identifier for the original data copy, wherein the other tracer identifier identifies at least one location within the original data copy and further identifies one or more tracer elements to be positioned at the identified at least one location;
mark the original data copy as identified by the other tracer identifier to produce another marked data copy, wherein said marking comprises positioning the one or more tracer elements at the identified at least one location within the original data copy, and wherein the tracer elements are perceptible to a user during normal presentation of the other marked data copy, and the other marked data copy appears to the user to be an unmarked copy of the requested particular data; and
return the other marked data copy to the other Web service client.

7. The system as recited in claim 1, wherein the program instructions are further executable by the processor to:
receive requests for particular data of the data collection from a plurality of Web service clients via a network;
for each request:
extract a copy of the requested particular data from the data collection as a particular data copy of the particular data;
determine an individualized tracer identifier for the particular data copy;
mark the particular data copy as identified by the individualized tracer identifier, wherein one or more tracer elements identified by the individualized tracer are perceptible in a normal presentation of the marked particular data copy, and the marked particular data copy appears to a user to be an unmarked copy of the requested particular data; and
return the marked particular data copy to the particular Web service client that sent the request.

8. The system a recited in claim 1, wherein the one or more tracer elements comprise a fictitious product review.

9. The system a recited in claim 1, wherein the one or more tracer elements comprise fictitious content inserted into one of textual data, graphical data, audio data, or video data.

10. The system as recited in claim 1, wherein the one or more tracer elements comprise one of textual data, graphical data, audio data, or video data.

11. The system as recited in claim 1, wherein the one or more tracer elements do not interfere with a typical use of the data copy into which they are inserted.

12. A method, comprising:
receiving a request for particular data of a data collection from a Web service client via a network;
extracting a copy of the requested particular data from the data collection as an original data copy of the particular data;
programmatically determining a tracer identifier for the original data copy, wherein the tracer identifier identifies at least one location within the original data copy and further identifies one or more tracer elements to be positioned at the identified at least one location;
wherein determining the tracer identifier further comprising determining the tracer identifier as a permutation of a tracer template, wherein the permutation includes digits and said digits representing the at least one location of the tracer elements;
marking the original data copy as identified by the tracer identifier, wherein said marking comprises positioning the one or more tracer elements at the identified at least one location within the original data copy, and wherein:
the one or more tracer elements are perceptible to a user during normal presentation of the marked data copy; and
the marked data copy appears to the user to be an unmarked copy of the requested particular data;
storing the tracer identifier for the marked data copy, wherein the stored tracer identifier links the marked data copy to the Web service client;
returning the marked data copy to the Web service client; and
repeating said receiving, said programmatically determining, said marking, said storing, and said returning for the same particular data for a different Web service client, wherein the tracer identifier for the Web service client and the tracer identifier for the different Web service client are different;
wherein said receiving, said extracting, said determining, said marking, said storing, said returning, and said repeating are all performed by a same Web service provider separate from the Web service client.

13. The method as recited in claim 12, wherein the tracer identifier is unique to the client to which the marked data copy of the particular data is returned.

14. The method as recited in claim 12, wherein the tracer identifier further links the marked data copy of the particular data with the request for the particular data received from the client.

15. The method as recited in claim 12, further comprising:
periodically or aperiodically searching the network for instances of at least a portion of the one or more tracer elements to generate a list of possible hits on instances of the marked data copy that was returned to the client;
determining from the list of possible hits a subset of the hits that are on instances of the marked data copy on the network; and
determining if any of the hits from the subset of the hits are on unauthorized instances of the marked data copy.

16. The method as recited in claim 15, wherein said determining if any of the hits from the subset of the hits are on unauthorized instances of the marked data copy comprises associating the client with the instances of the marked data copy according to the tracer identifier.

17. The method as recited in claim 12, further comprising:
receiving another request for the particular data of the data collection from another client via the network;
extracting another copy of the requested particular data from the data collection as the original data copy of the particular data;
programmatically determining another tracer identifier for the original data copy, wherein the other tracer identifier identifies at least one location within the original data copy and further identifies one or more tracer elements to be positioned at the identified at least one location;

marking the original data copy as identified by the other tracer identifier to produce another marked data copy, wherein said marking comprises positioning the one or more tracer elements at the identified at least one location within the original data copy, and wherein the tracer elements are perceptible to a user during normal presentation of the other marked data copy, and the other marked data copy appears to the user to be an unmarked copy of the requested particular data; and returning the other marked data copy to the other client.

18. The method as recited in claim 12, wherein the one or more tracer elements comprise one of textual data, graphical data, audio data, or video data.

19. The method as recited in claim 12, wherein the one or more tracer elements do not interfere with a typical use of the data copy into which they are inserted.

20. A computer-accessible storage medium, comprising program instructions, wherein the program instructions are computer-executable to implement:

determining a tracer identifier for an original data copy of particular data extracted from a data collection, wherein the tracer identifier identifies at least one location within the original data copy and further identifies one or more tracer elements to be positioned at the identified at least one location;

wherein determining the tracer identifier further comprising determining the tracer identifier as a permutation of a tracer template, wherein the permutation includes digits and said digits representing the at least one location of the tracer elements;

marking the original data copy as identified by the tracer identifier, wherein said marking comprises positioning the one or more tracer elements at the identified at least one location within the original data copy, and wherein:

the one or more tracer elements are perceptible to a user during normal presentation of the marked data copy; and the marked data copy appears to the user to be an unmarked copy of the requested particular data;

storing the tracer identifier for the marked data copy, wherein the stored tracer identifier links the marked data copy to a Web service client on a network that requested the data copy via a Web service interface to the data collection;

wherein the marked data copy is provided to the Web service client; and repeating said determining, said marking, and said storing for the same particular data for a different Web service client, wherein the tracer identifier for the Web service client and the tracer identifier for the different Web service client are different;

wherein said determining, said marking, said storing, and said repeating are all performed by a same Web service provider separate from the Web service client.

21. The computer-accessible storage medium as recited in claim 20, wherein the tracer identifier is unique to the Web service client to which the marked data copy of the particular data is provided.

22. The computer-accessible storage medium as recited in claim 20, wherein the tracer identifier further links the marked data copy of the particular data with the request for the particular data received from the Web service client.

23. The computer-accessible storage medium as recited in claim 20, wherein the program instructions are further computer-executable to implement:

periodically or aperiodically searching the network for instances of at least a portion of the one or more tracer elements to generate a list of possible hits on instances of the marked data copy including the tracer that was provided to the Web service client;

determining from the list of possible hits a subset of the hits that are on instances of the marked data copy on the network; and determining if any of the hits from the subset of the hits are on unauthorized instances of the marked data copy.

24. The computer-accessible storage medium as recited in claim 23, wherein, in said determining if any of the hits from the subset of the hits are on unauthorized instances of the marked data copy, the program instructions are further computer-executable to implement associating the Web service client with the instances of the marked data copy according to the tracer identifier.

25. The computer-accessible storage medium as recited in claim 20, wherein the program instructions are further computer-executable to implement:

determining another tracer identifier for an original data copy of the particular data extracted from the data collection, wherein the other tracer identifier identifies at least one location within the original data copy and further identifies one or more tracer elements to be positioned at the identified at least one location;

marking the original data copy as identified by the other tracer identifier to produce another marked data copy, wherein said marking comprises positioning the one or more tracer elements at the identified at least one location within the original data copy, and wherein the tracer elements are perceptible to a user during normal presentation of the other marked data copy, and the other marked data copy appears to the user to be an unmarked copy of the requested particular data; and wherein the other marked data copy is provided to another Web service client that requested the data copy via the Web service interface.

26. The computer-accessible storage medium as recited in claim 20, wherein the one or more tracer elements comprise one of textual data, graphical data, audio data, or video data.

27. The computer-accessible storage medium as recited in claim 20, wherein the one or more tracer elements do not interfere with a typical use of the data copy into which they are inserted.

28. A system, comprising:

a processor; and a memory comprising program instructions, wherein the program instructions are executable by the processor to implement a tracer service configured to implement:

receiving an original data copy of particular data from a client application of the tracer service via a network;

determining a tracer identifier for the original data copy, wherein the tracer identifier identifies at least one location within the original data copy and further identifies one or more tracer elements to be positioned at the identified at least one location;

wherein determining the tracer identifier further comprising determining the tracer identifier as a permutation of a tracer template, wherein the permutation includes digits and said digits representing the at least one location of the tracer elements;

marking the original data copy as identified by the tracer identifier, wherein said marking comprises positioning the one or more tracer elements at the identified at least one location within the original data copy, and wherein:

the one or more tracer elements are perceptible to a user during normal presentation of the marked data copy; and the marked data copy appears to the user to be an unmarked copy of the requested particular data;

storing the tracer identifier for the marked data copy, wherein the stored tracer identifier links the marked data copy to a client of the client application;

returning the marked data copy to the client application via the network; and repeating said receiving, said determining, said marking, said storing, and said returning for the same particular data for a different Web service client, wherein the tracer identifier for the client of the client application and the tracer identifier for the different client of the client application are different;

wherein said tracer service is separate from the client of the client application.

29. The system as recited in claim 28, wherein the tracer identifier is unique to the client of the client application.

30. The system as recited in claim 28, wherein the tracer identifier further links the marked data copy with a request for the data copy received by the client application from the client of the client application.

31. The system as recited in claim 28, wherein the tracer service is further configured to:

search the network for instances of at least a portion of the one or more tracer elements to generate a list of possible hits on instances of the marked data copy that was returned to the client application;

determine from the list of possible hits a subset of the hits that are on instances of the marked data copy on the network; and determine if any of the hits from the subset of the hits are on unauthorized instances of the marked data copy.

32. The system as recited in claim 31, wherein, to determine if any of the hits from the subset of the hits are on unauthorized instances of the marked data copy, the client of the client application is associated with the instances of the marked data copy according to the tracer identifier.

33. The system as recited in claim 28, wherein the tracer service is implemented as a Web service that provides a Web service interface to functions of the tracer service, and wherein said receiving an original data copy of particular data from a client application and said returning the marked data copy to the client application are performed according to the Web service interface.

34. The system as recited in claim 28, wherein the one or more tracer elements comprise one of textual data, graphical data, audio data, or video data.

35. The system as recited in claim 28, wherein the one or more tracer elements do not interfere with a typical use of the data copy into which they are inserted.

* * * * *